(12) United States Patent
Mehraeen et al.

(10) Patent No.: US 12,437,942 B2
(45) Date of Patent: Oct. 7, 2025

(54) BIPOLAR HYBRID CIRCUIT BREAKER FOR LOW-VOLTAGE DC CIRCUITS

(71) Applicant: Board of Supervisors of Louisiana State University and Agricultural and Mechanical College, Baton Rouge, LA (US)

(72) Inventors: Shahab Mehraeen, Baton Rouge, LA (US); Sudipta Sen, Baton Rouge, LA (US); Mohammadamin Moghbeli, Baton Rouge, LA (US); David Rush, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 62 days.

(21) Appl. No.: 18/438,040

(22) Filed: Feb. 9, 2024

(65) Prior Publication Data

US 2024/0186086 A1    Jun. 6, 2024

Related U.S. Application Data

(63) Continuation-in-part of application No. 18/482,609, filed on Oct. 6, 2023.

(Continued)

(51) Int. Cl.
*H01H 33/59* (2006.01)
*H01H 9/54* (2006.01)
*H02H 3/08* (2006.01)
*H02H 3/087* (2006.01)
*H01H 33/14* (2006.01)

(52) U.S. Cl.
CPC .......... *H01H 33/596* (2013.01); *H01H 9/542* (2013.01); *H02H 3/087* (2013.01); *H01H 2033/146* (2013.01)

(58) Field of Classification Search
CPC ....... H01H 33/596; H01H 9/542; H02H 3/087
See application file for complete search history.

(56) References Cited

U.S. PATENT DOCUMENTS

2015/0372473 A1* 12/2015 Wang ................. H01H 71/1045
                                                        361/57
2019/0229529 A1*  7/2019 Askan ................. H02H 1/0007
(Continued)

*Primary Examiner* — Scott Bauer
(74) *Attorney, Agent, or Firm* — Thomas | Horstemeyer, LLP

(57) ABSTRACT

A DC circuit breaker system includes a first mechanical switch, a first parallel capacitor connecting a first terminal and a second terminal of the first mechanical switch, a second mechanical switch in series with the first mechanical switch, a second parallel capacitor connecting a first terminal and a second terminal of the second mechanical switch, a first diode connecting the first terminal and the second terminal; and a second diode connecting the first terminal and the second terminal. The first mechanical switch separates contacts in response to a fault current; the second mechanical switch separates contacts in response to the fault current; and opening the first and second mechanical switches and turning off the first and second diodes reverses current flow and clears a current fault. The DC circuit breaker system may also be equipped with a surge arrestor at its input and a freewheeling diode at its output.

14 Claims, 15 Drawing Sheets

Proposed DC Breaker

Related U.S. Application Data

(60) Provisional application No. 63/426,443, filed on Nov. 18, 2022, provisional application No. 63/414,179, filed on Oct. 7, 2022.

(56) References Cited

U.S. PATENT DOCUMENTS

| | | | |
|---|---|---|---|
| 2021/0305980 A1* | 9/2021 | Sim | H02H 7/008 |
| 2023/0005676 A1* | 1/2023 | Ho | H01H 9/548 |
| 2023/0368991 A1* | 11/2023 | Isaji | H01H 33/596 |
| 2023/0411091 A1* | 12/2023 | Inagaki | H01H 33/596 |

* cited by examiner

BIPOLAR HYBRID CIRCUIT BREAKER FOR LOW-VOLTAGE DC CIRCUITS

CROSS-REFERENCE TO RELATED APPLICATION

This application is a continuation-in-part of co-pending U.S. utility application entitled, "A Bipolar Hybrid Circuit Breaker for Low-Voltage DC Circuits," having application Ser. No. 18/482,609, filed Oct. 6, 2023, which claims priority to U.S. provisional application entitled, "A Bipolar Hybrid Circuit Breaker for Low-Voltage DC Circuits," having application No. 63/414,179, filed Oct. 7, 2022, and claims priority to U.S. provisional application entitled, "A Bipolar Hybrid Circuit Breaker for Low-Voltage DC Circuits," having application No. 63/426,443, filed Nov. 18, 2022, each of which is entirely incorporated herein by reference.

STATEMENT REGARDING FEDERALLY SPONSORED RESEARCH OR DEVELOPMENT

This invention was made with government support under Grant Number 1151141 awarded by the National Science Foundation. The government has certain rights in the invention.

BACKGROUND

DC (Direct Current) grids have attracted great attention in the recent years. Micro and large distribution grids that utilize DC generation have made the conventional AC (Alternating Current) grids more versatile and this, in turn, have led to the reconsideration of DC networks in medium and low-voltage circuits. Despite of all the advantages of DC grids over their AC counterparts (e.g., absence of reactive power, lower path impedance, compatibility with renewable sources, etc.), fault clearance in DC networks has remained one important factor in its implementation.

Research and development in DC power systems originate from 1970s and its use was limited to mainly high voltage applications, unlike AC systems that were used in various voltage levels in transmission and distribution systems. By contrast, with recent advances in production of low-loss and high-frequency semiconductor technologies and the use of multi-terminal direct current (MTDC) systems, it is easier to convert power from different sources of generation such as wind farms, solar panels, tidal waves generators, etc., at various voltage levels. Besides, in power grids with different voltage or frequency specifications using DC lines gives more control on power flow and direction thus benefiting the power market as well as the grid stability. DC micro grids, on the other hand, support bidirectional power flow in low-voltage levels where it is easier and more efficient to integrate multiple DC distributed power sources and loads (including batteries and renewables), which eliminates the additional energy conversion and complex control methods.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
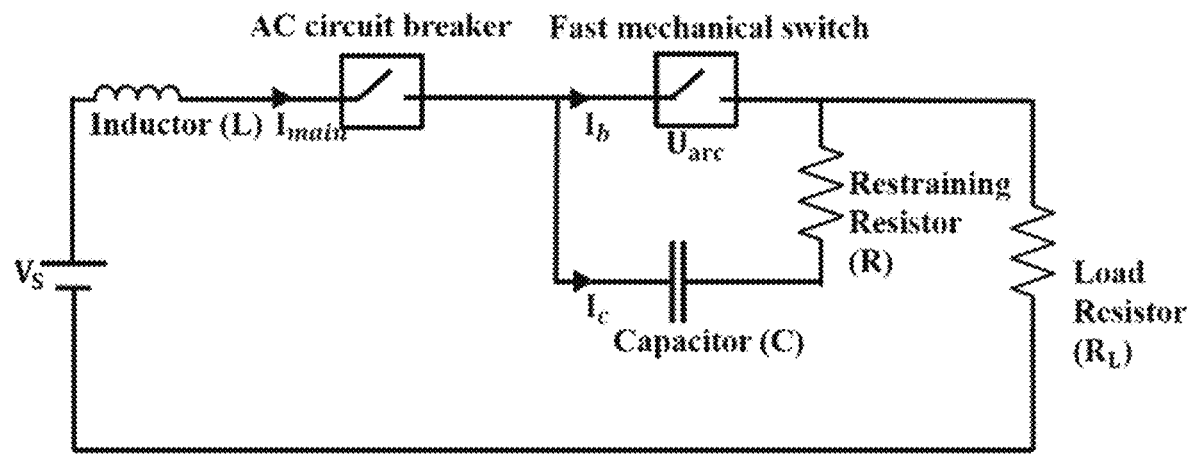
FIG. 1 shows a pre-existing DC circuit breaker system.

Protection of DC systems against short circuit currents is very challenging. Present available DC breakers fall into three categories: mechanical, static, and hybrid DC breakers. With the advent of DC circuits, generation, and loads, DC breakers are required for system protection. There are two main challenges in developing DC circuit breakers (DCCBs) regarding current interruption for system safety and protection. First, the DC system has considerably lower impedances compared to an AC system which leads to higher short circuit currents. Therefore, the main criteria in developing DCCB is that it must interrupt the fault current significantly faster than an AC breaker in order to prevent danger to the lives, property, and components. In multi-terminal direct current (MTDC) systems, the demand for DC breaker operating times is limited to a few milliseconds.

Second, unlike AC systems where the operating principle of breakers are based on current zero crossing, the DC circuit lacks the natural current zero crossing. Therefore, one of the many available strategies for DCCB operation is to artificially create a zero crossing of the current and use a mechanical switch to interrupt the current. The mechanical breakers have the advantage of low on-state losses. However, due to their relatively longer commutation time and subsequently slow response times (30-40 ms at higher voltages), low current breaking capacity, shorter life span due to wear and tear of the mechanical contacts, and higher maintenance cost, they are not suitable to use without additional mechanisms. In case of high voltages, in addition to increasing the dielectric strength between contacts, parallel branches are added to enforce current zero crossing and absorb the energy stored in line inductors and capacitors.

With recent developments in the solid-state (static) switches, static breakers are used as DCCB to force the current to zero and break the circuit through a rapid increase in the path impedance. In solid-state DC circuit breakers (SDCCB), the mechanical switch is replaced with a string of series semiconductor devices such as SiC-based insulated-gate bipolar transistor (IGBT), integrated gate-commutated thyristor (IGCT), gate turn-off thyristor (GTO), gate commutated turn-off thyristor (GCT), etc. These breakers can interrupt the current in the order of a few microseconds in case of a short circuit as they increase the current path impedance very fast once they are triggered and thus no arc is developed. However, due to the presence of the static switches, these types of breakers generate a significantly high voltage rate-of-change, resulting in high switching voltages across components, and bear a high steady-state loss at high power levels that are not desirable.

Hybrid DC circuit breakers combine mechanical circuit breakers and solid-state circuit breakers and take advantage of both schemes. They produce very low power loss in the normal operation due to the mechanical breaker component but long operating life span due to the solid-state component at current disruption while there is no need for a forced current zero crossing to extinguish the arc. However, opening of the mechanical breaker and the accompanying arc voltage between the moving contacts governs current commutation. Thus, fault response time in conventional hybrid breakers relies mostly on the mechanical switch speed, ranging up to several milliseconds. Also, the protection voltage of energy absorption circuit is generally set to 1.5 times of the DC source voltage to handle voltage overshoots, and thus, a large number of IGBTs are needed, leading to a high cost of hybrid DCCBs. Table 1 (below) provides a comparison and summarization of different models of DC circuit breakers.

TABLE 1

|  | Mechanical circuit breaker | Solid state circuit breaker | Hybrid circuit breaker |
| --- | --- | --- | --- |
| Response time | Slow (Tens of millisecond) | Very fast (Few microsecond) | Fast (Few millisecond) |
| Loss | Very low | Very high | Low |
| Size | Compact | Big | Relatively small |
| Cost | Low | High | Very high |

There are several factors that can affect the selection of DC breakers among which maximum interrupting current and the operating speed are two key characteristics. DCCBs should be appropriately designed to conduct a fast transition from the conduction to blocking state without stress during breaking and should be able to generate a blocking voltage across their terminals to block the current. The available DCCB technologies have the following shortcomings: (1) Current redirection is generally created using additional (typically bulky) inductors to induce current oscillations and zero crossing in both mechanical and hybrid DCCBs; (2) Capacitive parallel path can be used for redirecting the current from the mechanical switch; however, the current oscillations cause large voltage overshoots across the mechanical switch causing reignition of an arc when small capacitors are used. Large capacitors are also not favorable due to space limitations and slow operation; and (3) While series combination of mechanical switches can be used to reduce voltage stress across individual switch terminals, synchronizing the breakers tripping for current disruption is difficult resulting is voltage stress across the faster switch.

The present disclosure presents a new alternate system and method to break DC currents for low-voltage applications and/or high-voltage applications. An exemplary DCCB mechanism utilizes two switches along with two diodes, to reverse the direction of the current flow and clear the fault. For example, an exemplary DCCB system and method utilizes a bipolar breaker with two series mechanical switches in normal condition. The switches are accompanied by parallel capacitors and redirecting diodes. Thus, the voltage across the switches and their associated capacitors does not go higher than that of the DC source regardless of the disrupted current, capacitance, and switching occurrence of the individual mechanical switches. That is, voltage ratings for switches and capacitors are maintained low. Subsequently, fault current disruption is conducted via two redirecting paths; namely, parallel capacitors and series diodes. In addition, the fault energy is partially sent back to the DC source reducing the absorption burden on the switches and capacitors. This is different than the conventional single-switch commute-and-absorb method used in mechanical or static breakers in the sense that it reverses the current direction and delivers part of the fault energy back to the source. It is shown that an exemplary system and method can break the fault current effectively with minimal arc and significantly reduce the voltage across the mechanical switches. As such, exemplary systems and methods of the present disclosure can generate a current zero crossing in the DC switch by reversing and rerouting the current during breaking and can generate current decay with minimal arc using two series mechanical switches, commutating capacitors, and redirecting diodes.

The advantages of the disclosed topology include (but are not limited to): (1) An additional inductor is not used in the current redirecting path and a current zero crossing is created via natural current oscillation with the help of line inductance or converter smoothing reactor; (2) Current disruption is performed with minimal arc and the voltage across the individual breakers' contacts do not exceed the source voltage; (3) Fault energy is partially moved back to the DC source and thus less stress is imposed on the surge arrestors/dissipating circuitry; (4) The solid-state current paths use diodes and thus no triggering signals are required. Also, no synchronization is necessary for the mechanical switches; (5) The voltage rate-of-change is maintained at low levels compared to both available mechanical and solid-state switches through the use of a parallel capacitors; (6) Since it is a hybrid structure, the steady-state current flows though mechanical switches and thus steady-losses are minimal; (7) Also, the redirecting diodes generate a reverse voltage in an RL circuit that creates rapid decay and zero crossing of current for safe switch operation. By contrast, available hybrid topologies require a delay in the solid-state switch operation to allow mechanical switch separation, which can significantly increase the fault current; (8) The exemplary topology limits the voltage tolerated by the mechanical switches and parallel capacitors to that of the source regardless of the capacitor size, unlike in available methods where parallel capacitor voltage can be much higher than source voltage. Thus, smaller values of parallel capacitors can be used with the exemplary DCCB mechanism. This leads to an overall breaker reduced size; (9) Unlike in simple series combination of switches where asynchronous switch operations cause voltage stress on one switch, an exemplary breaker employs asynchronous operation of two switches without any voltage stress on individual switches; and (10) Finally, the burden on the absorb-and-release circuit that dissipates fault energy is reduced since part of the fault energy is sent back to the DC source.

The inventors introduced a two-switch DC breaker mechanism for low-voltage applications in their past work. In the previous work, a parallel capacitive path to the main DC switch generates an oscillatory current in the main circuit with the help of line/smoothing inductance leading to current zero crossing for a second low-cost (AC) breaker, as shown in FIG. 1. The mechanism of FIG. 1 is able to increase the DC breaker's voltage rating since the capacitive path contributes to current disruption with minimal arc. In the inventor's past work, a 28V mechanical DC switch was successfully able to interrupt rated current at 280V. However, since the entire fault energy is stored in the parallel (to DC switch) capacitor during current disruption, it eventually causes a high voltage, often significantly larger than the source voltage, across the switch's open contacts and parallel capacitor. While the high voltage does not harm the open switch, it requires higher capacitor voltage rating for small values of capacitance leading to an increased size for the breaker. In addition, the capacitor high voltage can be accompanied by a fast voltage rise in the case of a high frequency current oscillation due to small line inductance. This in turn, may cause reignition of arc in the DC breaker. Consequently, the capacitor size must be large enough to avoid the mentioned issues.

Figure 2:
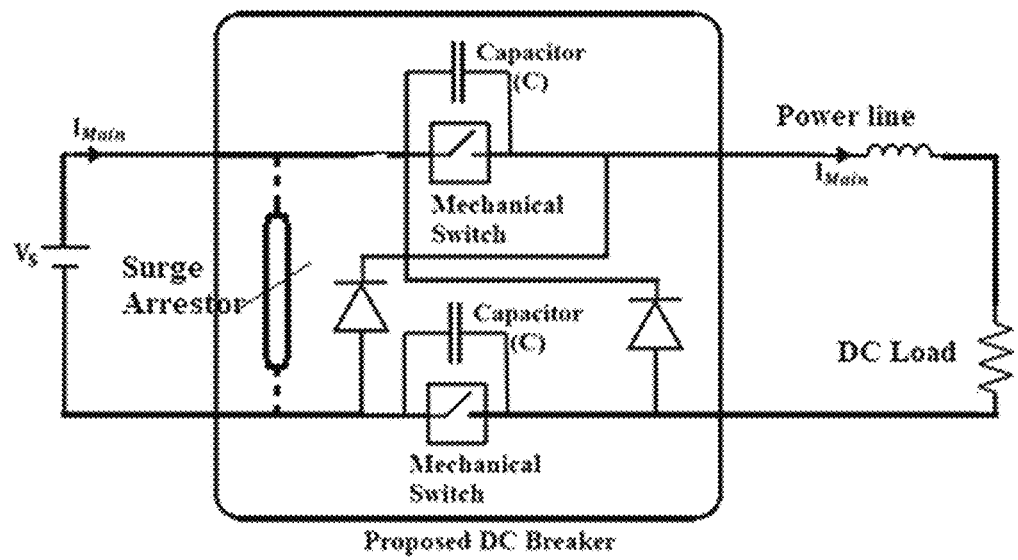
FIG. 2 shows an exemplary DC circuit breaker system in accordance with various embodiments of the present disclosure.

The present disclosure presents a hybrid two-switch bipolar DC breaker that alleviates the shortcomings of the inventors' past work. An exemplary DC breaker of the present disclosure uses both sending and receiving line terminals as shown in FIG. 2. The exemplary DC breaker can be used close to the DC source without the surge arrestor or in the middle of DC power lines with a surge arrestor. In various embodiments, the surge arrestor is coupled between a terminal of a first mechanical switch and a terminal of a second mechanical switch.

Series combination of DC solid-state switches has been presented to enhance voltage rating of the DC breaker. While mechanical switches are superior in steady-state operation due to low series impedance, this approach is problematic when mechanical switches are used due to difficulties in synchronizing multiple switches. Since one switch is always faster than the other, it must tolerate a significant voltage stress leading to higher voltage rating that contradicts the purpose of series combination. The exemplary topology employs a series combination of two mechanical switches while mitigating the aforementioned problem. In the exemplary DC breaker design, switches are accompanied by parallel capacitors and redirecting diodes. Thus, the voltage across the switches and their associated capacitors does not go higher than that of the DC source regardless of the disrupted current, capacitance, and switching occurrence of the individual mechanical switches. That is, voltage ratings for switches and capacitors are maintained low. In addition, the fault energy is partially sent back to the DC source reducing the absorption burden on the switches and capacitors. The operation of the exemplary DC breaker is described next. The current disruption procedure comprises four different stages as discussed below.

Figure 3:
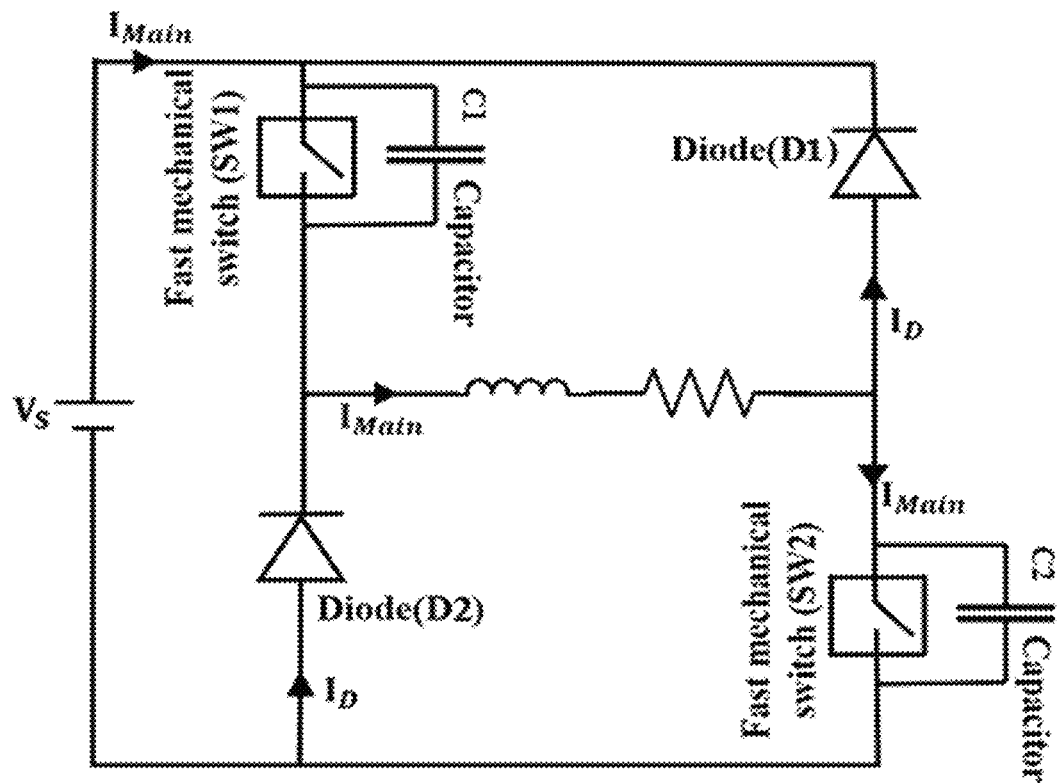
FIG. 3 shows a simplified diagram of the exemplary DC circuit breaker system of FIG. 2.

Stage 1: In this stage, both mechanical switches are closed and the (fault or steady-state) current flows through Switch 1 (SW1), power line, load, and Switch 2 (SW2) as shown in FIG. 3. Capacitors have no charge in them and redirecting diodes are in OFF state.

Stage 2: The trip signal is issued to both the mechanical switches; however, they do not open at the same time due to the inherent different mechanical properties. Let's assume SW2 opens first and starts to generate an increased voltage across its contacts. Subsequently, current is redirected through capacitor C2. The voltage across the contacts is established due to rapid increase in the path impedance and initiation of an arc. However, the parallel capacitor C2 prevents a significant arc and thus current redirection is accomplished with minimal arc once an appropriate capacitor size is selected. The load current continues to flow through SW1 and C2, in the RLC circuit comprising line/load series resistance and inductance as well as C2, until the voltage across C2 exceeds the source voltage. At this instant, diode D1 turns on. The series resistance includes that of the line in case of a short circuit or load resistance when disrupting normal current. Also, the path inductance comprises that of the line/load and possibly smoothing reactor/filter. The established RLC circuit generates an under-damped oscillation in the current causing it to decay with frequency of $1/\sqrt{LC}$. An appropriate selection of capacitor size leads to rapid decay in the now-sinusoidal current. For small values of parallel capacitance, this stage is very short.

Stage 3: Since SW1 is still closed, the load current continues to flow through diode D1 forming an RL circuit. If SW1 remains closed, all the inductor energy is consumed in the resistive element. In this occasion, the time constant pertaining to the current decay is the same as that of the original current rise.

Stage 4: Upon opening Switch 1 (SW1), capacitor C1 starts to re-route the current and thus the voltage across C1 increases in the now-RLC circuit comprising series resistance and inductance and C1 (and D1), until the voltage across C1 exceeds the source voltage. At this instant, diode D2 turns on. For smaller values of parallel capacitance, this stage is very short. Also, it is important to note that the parasitic inductance between the voltage source and the breaker is considered negligible; that is, the breaker is placed right next to the voltage source. Otherwise, in order for the Stage 3 and Stage 4 to occur, a surge arrestor is required to clamp the voltage at the DC source voltage level (see FIG. 2.)

Stage 5: Since SW1 is now open the load current continues to flow through D2 and D1 forming an RL circuit causing the inductor energy to be consumed in the resistive element. The reverse DC voltage across the RL circuit helps a fast-current decay in this stage and the current crosses zero. In this occasion, the time constant pertaining to the current decay is the same as that of the original current rise. In this stage, some of the energy pertaining to the disrupted current is delivered back to the source.

Stage 6: Once the current crosses zero and reverses direction, D1 and D2 turn off and RLC circuit comprising capacitors C1 and C2, line inductance, load/fault resistance, and DC source causes voltages at C1 and C2 to decay to half the DC source in an underdamped fashion. Due to small amount of stored energy in the capacitors, the oscillating current in this state is very small. Large resistors can be attached in parallel with the capacitors so that the capacitive energy is depleted at the end of this stage.

For smaller capacitors, the current disruption mostly takes place in Stages 3 and 5 where RL current decays occur. Also, if the switches are contacts of the same breaker triggered with the same coil, Stages 2 through 4 are relatively small and thus the current disruption takes place mostly at Stage 5.

As previously discussed, an exemplary two-switch bipolar breaker of the present disclosure has a number of advantages. Since it is a hybrid structure, the steady-state current flows though mechanical switches and thus steady-losses are minimal. Also, the redirecting diodes generate a reverse voltage in an RL circuit that creates rapid decay and zero crossing of current for safe switch operation. By contrast, available hybrid topologies require a delay in the solid-state switch operation to allow mechanical switch separation, which can significantly increase the fault current. The exemplary topology limits the voltage tolerated by the mechanical switches and parallel capacitors to that of the source regardless of the capacitor size, unlike in available systems/methods where parallel capacitor voltage can be much higher than source voltage. Thus, smaller values of parallel capacitors can be used with the exemplary mechanism of the present disclosure. This leads to an overall breaker reduced size. Unlike in simple series combination of switches where asynchronous switch operations cause voltage stress on one switch, the exemplary breaker employs asynchronous operation of two switches without any voltage stress on individual switches. Finally, the burden on the absorb-and-release circuit that dissipates fault energy is reduced since part of the fault energy is sent back to the DC source.

Figure 4:
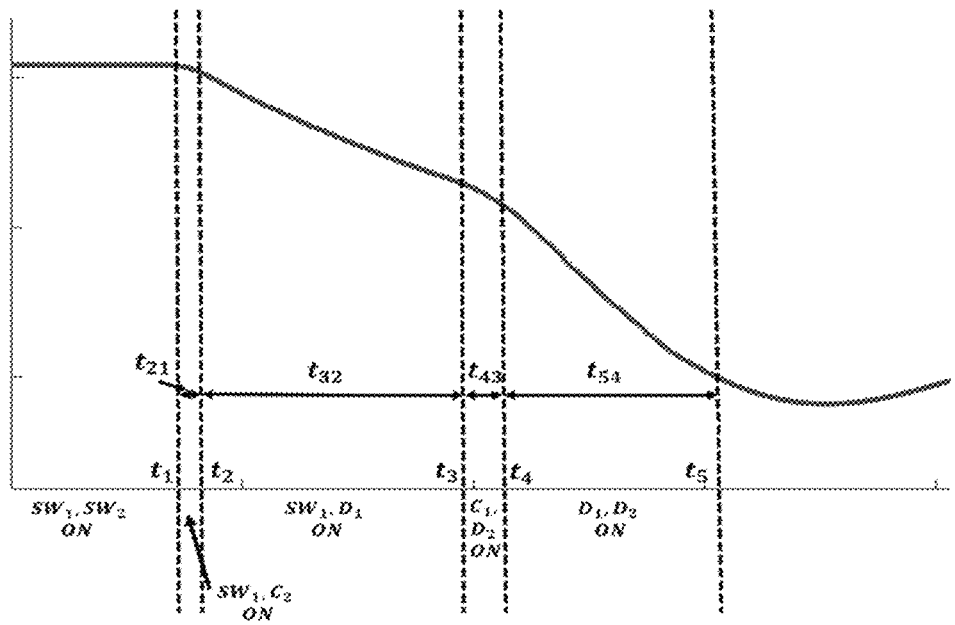
FIG. 4 shows a plot of a current flow path during stages of an exemplary DC circuit breaker system in accordance with various embodiments of the present disclosure.

In the following discussion, the total current disruption time is calculated based on the different stages explained in the previous section. Since each stage has a different equivalent circuit, one needs to calculate individual stage times and add up all the corresponding stage times for the total disruption time. FIG. 4 shows a sample disrupted current and pertinent stages. The disrupted current can be the fault or normal load current; nevertheless, we will use $I_{fault}$ loosely to represent both cases. Thus, Stage 1 contains the pre-disruption fault/load current $I_1 = I_{fault}$. Stages 2 through 5 cover the time starting disruption initiation till current zero crossing and thus will be elaborated here.

Figure 5A:
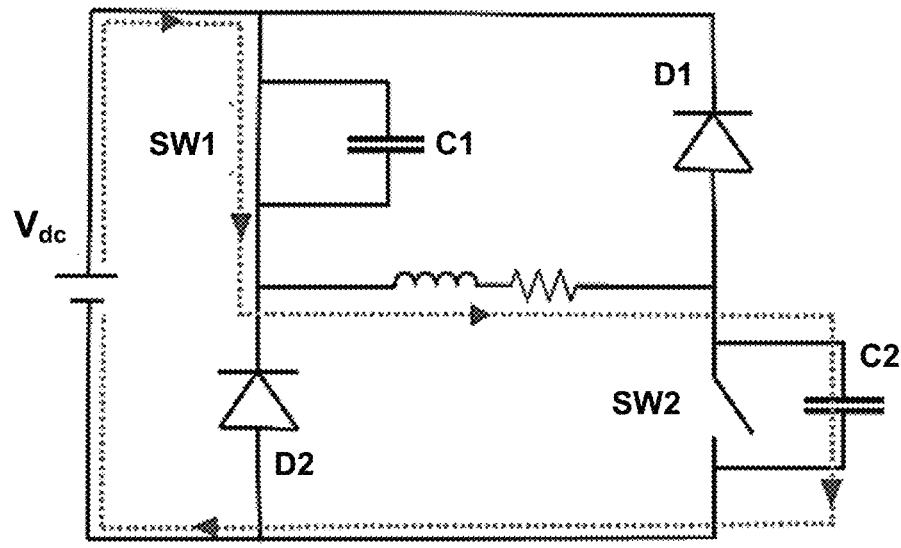
FIGS. 5a-5d show a plot of a current flowing path through (a) stage 2, (b) stage 3, (c) stage 4, and (d) stage 5 of an exemplary DC circuit breaker system in accordance with various embodiments of the present disclosure.

Stage 2 ($t_1$ through $t_2$): Due to asynchronous operation of mechanical switches, SW2 opens first forcing the current to flow through parallel capacitor C2 branch as shown in FIG. 5a. This stage starts with commutation of current through C2. Ideally, the current is re-routed through the parallel capacitor C2 immediately at $V_{C2}(0)=0$. The time to open breaker contacts $T_s$, which affects the capacitor initial voltage $V_{C2}(0)$, is the time between when the switch contacts begin to move and when the current through the switch reaches zero; i.e., commutation is complete. Time $T_s$ depends on mechanical properties of the switch. During the switch operation, the change in the capacitor current from zero to fault current $I_f$ is almost linear and $V_{C2}(0)$ can be approximated as $$V_{C2}(0) = \frac{1}{C_2} \int_0^{T_s} \frac{I_f}{T_s} t \cdot dt = \frac{I_f T_s}{2C_2}$$

with $T_s$ being the switch operation time. From the test results, it is shown that with an appropriate capacitor, $T_s$ is negligibly small (i.e., $T_s=0$) and thus $V_{C2}(0) \approx 0$. By applying Kirchhoff's voltage law (KVL) at the current path, one has $$\frac{d^2 I_2}{dt^2} + \frac{R}{L}\frac{dI_2}{dt} + \frac{I_2}{LC_2} = 0 \qquad (1)$$

where $I_2$ is the current at Stage 2. For an underdamped response, $$\frac{R}{L} \leq \sqrt{\frac{1}{LC_2}} \, ; C_2 \leq \frac{L}{R^2},$$

Equation (1) yields $$I_2(t_{21}) = k_1 e^{-\alpha t} \cos(\omega_d t + \varphi) \qquad (2)$$

where $$\alpha = \frac{R}{2L}, \omega_d = \sqrt{\omega_0^2 - \alpha^2},$$

and $$\omega_0 = \sqrt{\frac{1}{LC_2}}.$$

The initial conditions $I_2(0)=I_{fault}$ and $V_{C2}(0)=0$ are used to calculate $\varphi$ and $k_1$ as $$\varphi = -\tan^{-1}\left(\frac{1}{\alpha}\right)$$

and $$k_1 = I_{fault}\sqrt{1+\alpha^2}.$$

At the end of stage 2, capacitor voltage $V_{C2}(t_2)=V_S$. Due to high natural frequency, one can ignore the exponential term in (2) and approximate $V_{C2}$ by using $$V_{C2}(t_{21}) = -k_1 \cos(\omega_d t_{21} + \varphi\beta) = V_s$$

where $$\beta = \tan^{-1}\frac{\omega_d}{\alpha}.$$

That is, $$t_{21} = \frac{1}{\omega_d}\left[\cos^{-1}\left(-\frac{V_s}{k_1}\right) - \varphi + \beta\right]. \qquad (3)$$

At the end of Stage 2, the current can be calculated as $$I_2(t_{21}) = \frac{1}{\omega_d} I_{fault} \sqrt{1+\alpha^2} \, e^{-\alpha t_{21}} \cos(\omega_d t_{21} + \varphi).$$

This is used as the as initial condition for stage 3.

Figure 5B:
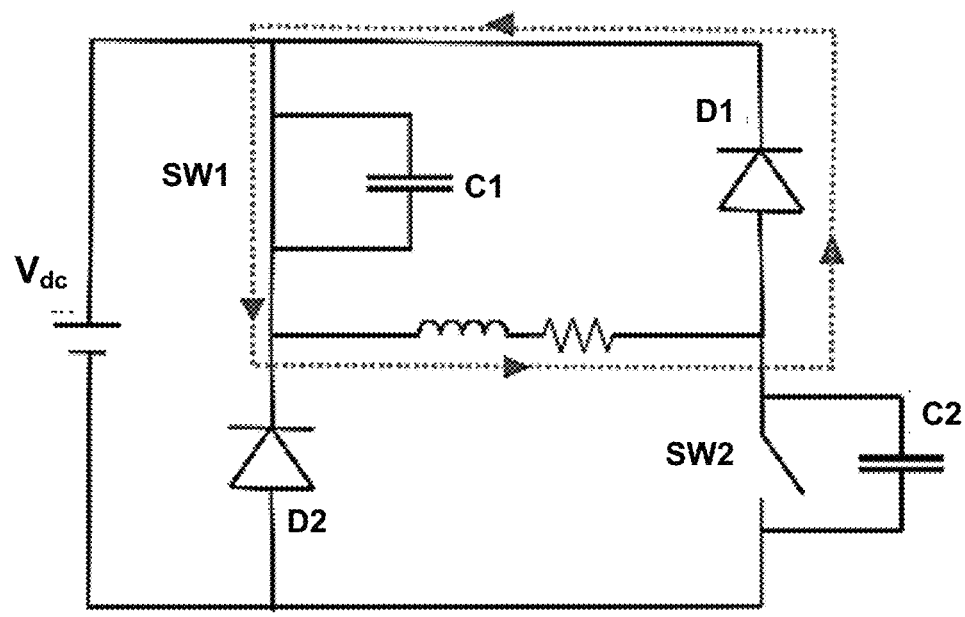

Stage 3 ($t_2$ through $t_3$). During this period capacitor C2 stops conducting current and switch SW1 has been triggered but due to delayed operation, SW1 still conducts current. In this stage the stored energy in the series inductor is discharged in the formed RL circuit as shown in FIG. 5b. From the figure, one can write the KVL as $$I_3 R + L \frac{dI_3}{dt} = 0 \tag{4}$$

where $I_3$ is the current in Stage 3. By solving (4), one has $$I_3(t_{32}) = I_2(t_{21}) e^{-t_{32} \frac{R}{L}}$$

where $I_2(t_{21})$ is the initial condition from stage 2. Time $t_{32}$ is basically the response time of switch SW1, which can be obtained from the breaker specifications. The overall breaking time can be minimized by minimizing $t_{32}$ through the use of fast mechanical switches. In simpler applications, SW1 and SW2 can be contacts of the same breaker that operate with the same coil, leading to relatively small $t_{32}$.

Figure 5C:
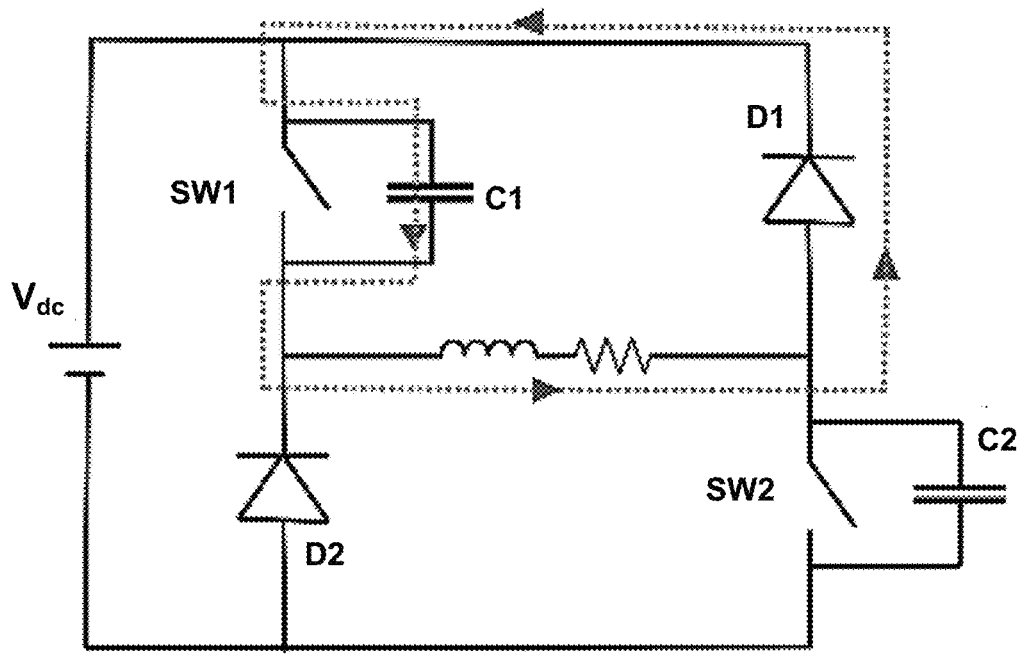

Stage 4 ($t_3$ through $t_4$). At the end of Stage 3, SW1 opens and the current is diverted to parallel capacitor C1 path and the current flows through the fault/load RL path, D1, and C1, as shown in FIG. 5c. Similar to Stage 2, this creates a series RLC circuit and writing KVL gives $$\frac{d^2 I_4}{dt^2} + \frac{R}{L} \frac{dI_4}{dt} + \frac{I_4}{LC_1} = 0 \tag{5}$$

where $I_4$ is the current in Stage 4 that, similar to (1), can be obtained as $$I_4(t_{43}) = k_2 \cos(\omega_d t_{43} + \varphi) e^{-\alpha t_{43}} \tag{6}$$

where:

$$\alpha = \frac{R}{2L}, \; \omega_d = \sqrt{\omega_0^2 - \alpha^2}, \text{ and } \omega_0 = \sqrt{\frac{1}{LC_1}}.$$

The initial conditions $I_3(t_{32})$ and $V_{C1}(0)=0$ are used to calculate $\varphi$ and $k_2$ as $$\varphi = -\tan^{-1}\left(\frac{1}{\alpha}\right) \text{ and } k_2 = I_3(t_{32})\sqrt{1+\alpha^2}.$$

Similar to stage 2, capacitor voltage can be obtained as $$V_{C1}(t_{43}) \approx -k_2 \cos(\omega_d t_{43} + \varphi - \beta) = V_S$$

where $$\beta = \tan^{-1} \frac{\omega_d}{\alpha}.$$

That is, $$t_{43} = \frac{1}{\omega_d}\left[\cos^{-1}\left(-\frac{V_S}{k_2}\right) - \varphi - \beta\right]. \tag{7}$$

At the end of Stage 4, the current can be calculated as $$I_4(t_{43}) = I_{32}\sqrt{1+\alpha^2} e^{-\alpha t_{43}} \cos(\omega_d t_{43} + \varphi).$$

This is used as the initial condition for Stage 5.

Figure 5D:
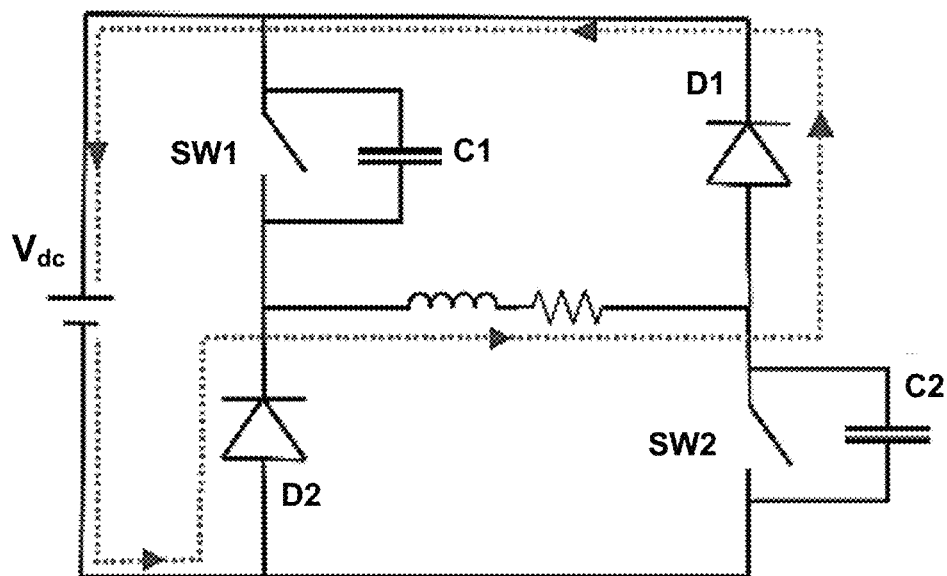

Stage 5 ($t_4$ through $t_5$). In this stage capacitor C1 stops conducting current and the current flows through the voltage source, D2, RL branch, and D1 as shown in FIG. 5d. Applying KVL then yields, $$I_5 R + L \frac{dI_5}{dt} = -V_{dc} \tag{8}$$

where $I_5$ is the current in Stage 5. Solving (8) yields $$I_5(t_{54}) = \left(I_{43} + \frac{V_{dc}}{R}\right) e^{-t_{54} \frac{R}{L}} - \frac{V_{dc}}{R} \tag{9}$$

where $I_{43}$ is the initial current calculated in Stage 4. At $t=t_{54}$, the current goes to zero; thus, from (9), one obtains $$t_{54} = \frac{L}{R} \ln\left(1 + \frac{I_{43} R}{V_{dc}}\right). \tag{10}$$

The total breaking current is then equal to $t_{total} = t_{21} + t_{32} + t_{43} + t_{54}$. From (3), (7), and (10), and assuming $C_1 = C_2$, the total current disruption time becomes $$t_{total} = \tag{11}$$
$$\frac{1}{\omega_d}\left[\cos^{-1}\left(-\frac{V_S}{d_1}\right) + \cos^{-1}\left(-\frac{V_S}{k_2}\right) - 2\varphi + 2\beta\right] + \frac{L}{R} \ln\left(1 + \frac{I_{43} R}{V_{dc}}\right) + t_{32}.$$

Hardware and simulation tests were performed to evaluate the efficiency of the proposed breaker. An experimental setup was built based on the diagram of FIG. 3. In the experiments, the current was restricted to around 40 A via appropriate load resistance to prevent damage to the DC supply in the lab. Also, a 10 mH, 50 A inductor was connected in series with the load to mimic line and reactor inductance. The voltage across the mechanical switches were measured using an oscilloscope. The current was also measured by the oscilloscope via load voltage using an isolated oscilloscope probe. Two identical switches were used and a single trigger signal was used to excite them. The mechanical switches were rated at 28 $V_{DC}$, 380 $V_{AC}$, 40 A. A number of tests at different voltage levels were performed where random delays between the mechanical switches make natural differences between the cases leading to certain stages becoming predominant as provided below.

Figure 6:
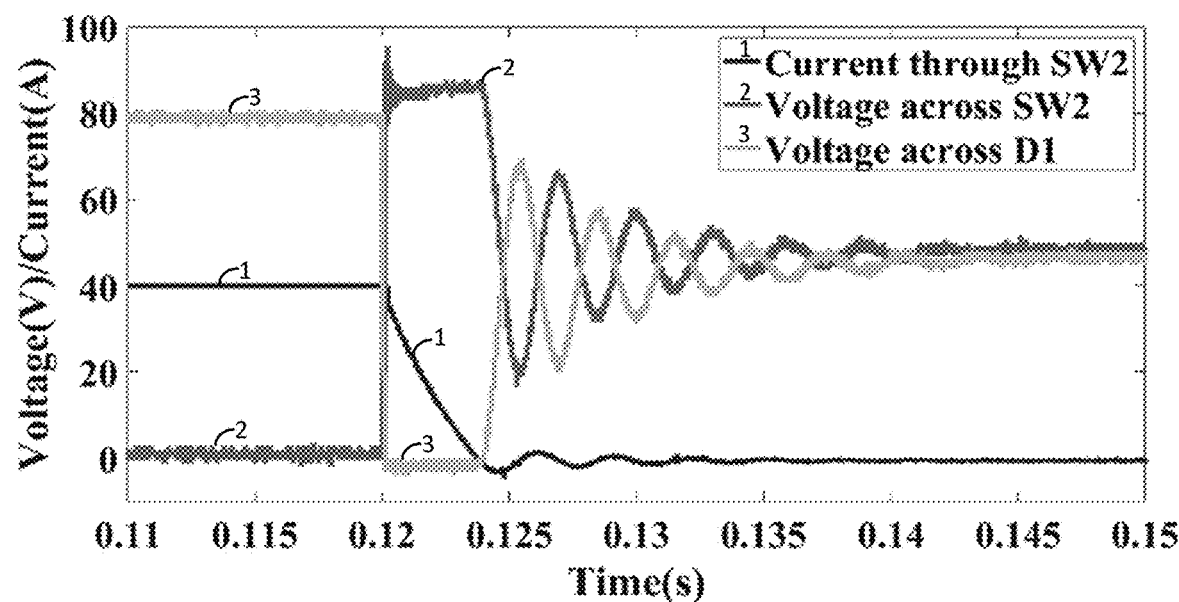
FIGS. 6-13 shows a plot of voltages and currents across components of an experimental setup of the DC circuit breaker system of FIG. 3 for various experimental test cases in accordance with the present disclosure.

Case 1: The DC supply is set at 80V. The circuit load is a 20 resistor in normal operating condition conducting 40 A. Two identical 40 µF capacitors are used in the commutating branches. Load current is then disrupted by a single trip signal to the switches. The voltages and current shown in FIG. 6 are the voltage across SW2, voltage across D1, and line current, respectively. Experimental results indicate that the delay between SW1 and SW2 varies around 2 ms and in this experiment, it is long enough so that current disruption majorly occurs at Stage 3 and transitions to Stage 5 at the end where the diodes impose a zero/reverse voltage across the RL branch followed by the oscillations of Stage 6. Stages 2 and 4 have very small durations (due to rapid capacitor charging caused by RLC natural frequency of $$\omega_d = \sqrt{\omega_0^2 - \alpha^2} \approx 1577 \text{ rad/s})$$

and can be ignored leading to smooth transition between Stages 3 and 5. According to the figure, current zero crossing occurs in almost 3.5 ms because of the small capacitor sizes. Once current zero crossing happens and diodes turn off, the RLC circuit of Stage 6 takes place with an oscillation frequency greater than that of Stage 2 due to the series combination of C1 and C2

$$\left(\omega_0 = \frac{1}{\sqrt{LC/2}} \approx 2236 \text{ Hz}\right).$$

Duration of Stage 6, where small remaining fault energy is dissipated, is not counted toward total disruption time.

Figure 7:
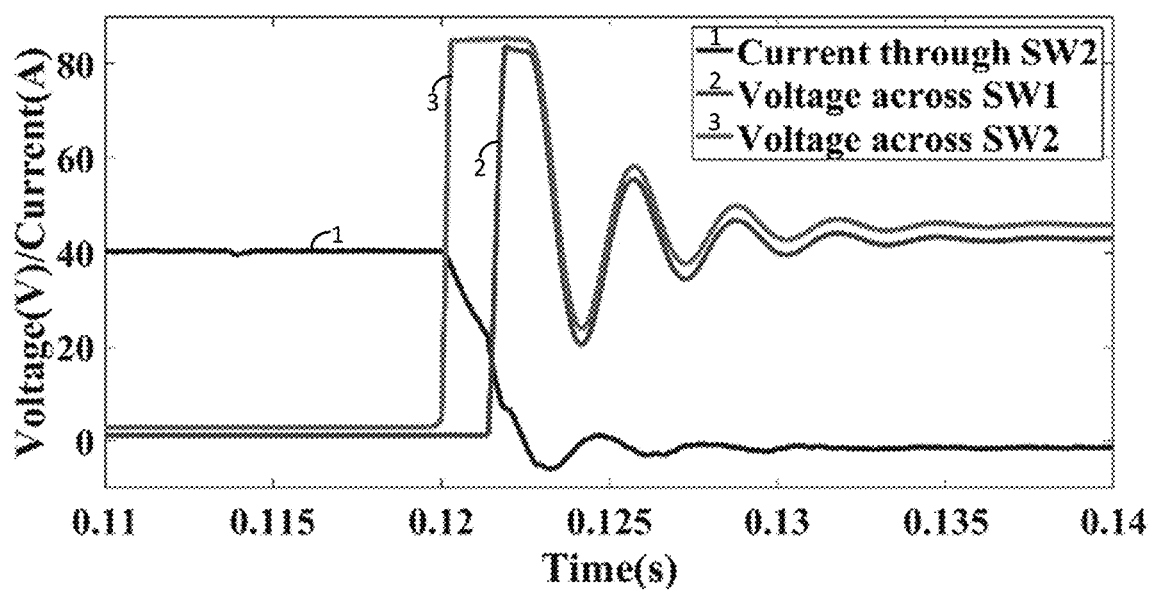

Case 2: Case 1 is repeated a few times and in some cases the delay between the switch operations became more evident than that is captured here. FIG. 7 depicts delayed operations of SW1 and SW2. From the figure, a delay time of 1.6 ms causes a different current zero crossing of 3.2 ms. Stage 4 oscillations occur in this experiment when C1 is charged at a reduced forward current in Stage 4 and reduces disruption time. This shows the effect of delay time between switch operations. Note that the capacitor voltages are clamped at supply voltage.

Figure 8:
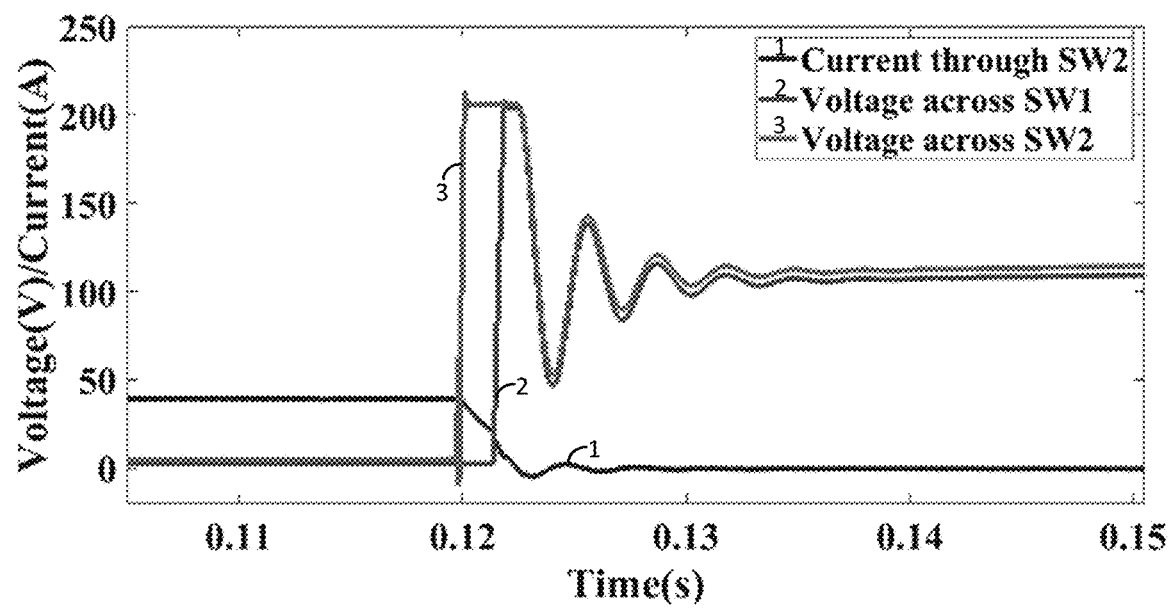
Figure 9:
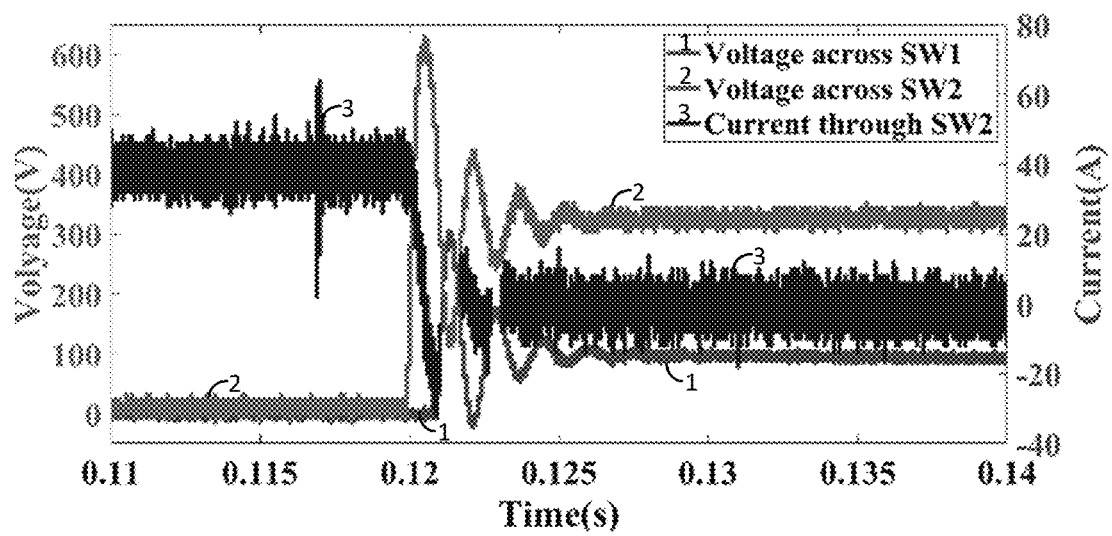

Case 3: The test is now repeated at 200V and 40 A (5.0 Ohm load). The significance of redirecting diodes is the claimed voltage and zero/reverse voltage across the circuit for current disruption. In order to show the effect of the redirecting diodes, the test is performed with the diodes D1 and D2 removed. The results are compared and illustrated in FIGS. 8 and 9. When the diodes are removed, the breaker is reduced to the conventional series combination of switches and associated parallel capacitors. Due to the inherent delay between the switch operations, the final voltages across the switches are not equal and LC transients are predominant that degrade the breaker performance. The current zero crossing occurs at different times of 3 ms and 2.5 ms for the breakers with and without diodes, respectively. While the RLC oscillations cause a slightly shorter current disruption time when diodes are removed, there is a significant overvoltage (three times the source voltage) in the latter case causing higher voltage rating requirements for both capacitor and mechanical switch. The voltage overshoot can be remedied by larger capacitors, which in turn increase the breaker size. Thus, asynchronous operations of the mechanical switches cause voltage imbalance across the two switches when diodes are removed.

Figure 10:
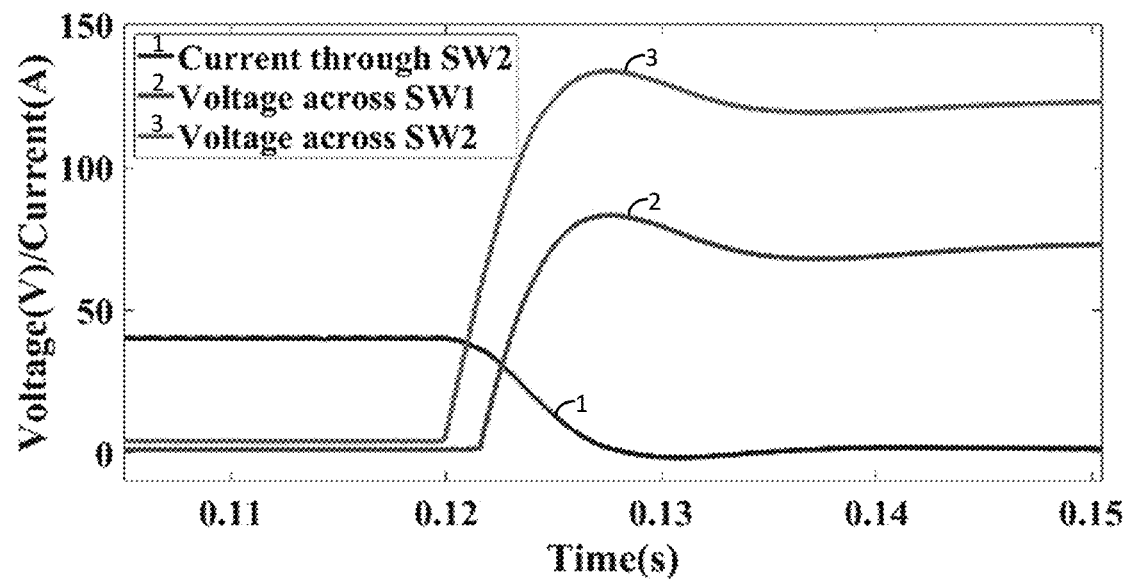

Case 4: In this case the effect of capacitor size on the operation of the exemplary breaker circuit is evaluated. The parallel capacitors in the previous tests are now replaced with 1000 µF ones. The breaker is first tested with redirecting diodes removed. The large values of capacitance cause a slower current decay of 7.5 ms compared to the previous cases, a smaller voltage overshoot, and a current disruption with mostly no visible arc (except in few trials) as illustrated in FIG. 10. The final values of capacitor voltages indicate an unbalanced (but small) burden on the two switches with asynchronous switch operations.

Figure 11:
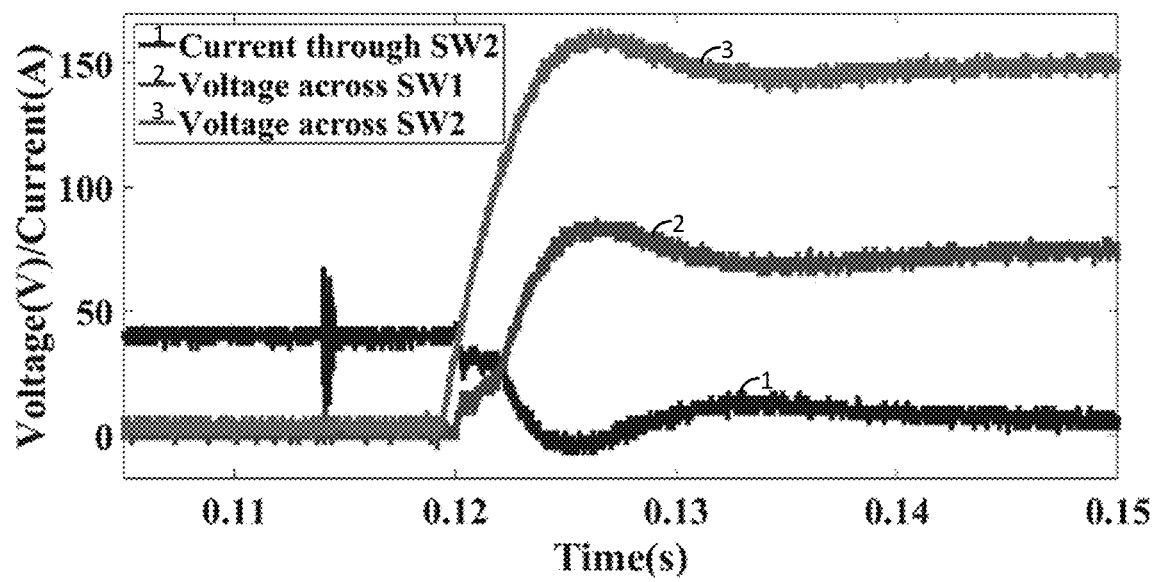
Figure 12:
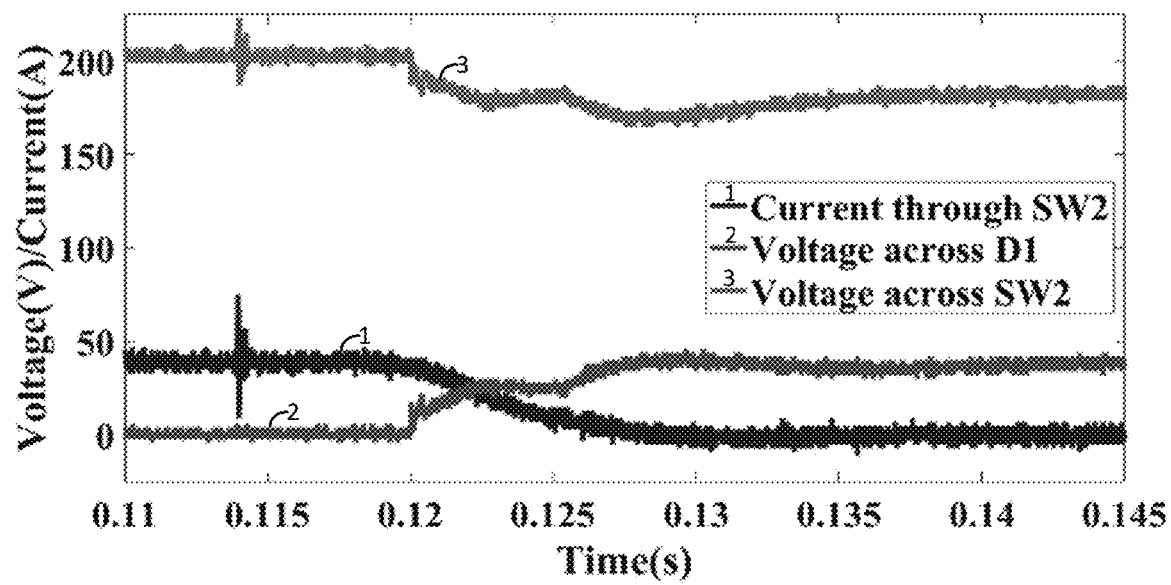

Next, the test is repeated twice with the redirecting diodes and the results are shown in FIGS. 11 and 12. Similar to the previous scenario, the current goes to zero in 7 ms due to large values of the parallel capacitors. The switch voltages also rise slowly due to large capacitor value and are less than the supply voltage. However, slower operation results in voltage imbalance across the two switches and parallel capacitors. Due to the slow voltage rise in the capacitors, they do not reach the supply voltage and thus the redirecting diodes are not turned on before the current changes direction. This in turn causes imbalance charges in the capacitors. That is, the current disruption mostly occurs in Stage 2; i.e., RLC behavior. Through this test, the voltage rating of the mechanical switch (28 $V_{DC}$) is significantly increased (200 $V_{DC}$).

Table 2 (below) summarizes the theoretical and experimental current zero crossing times for different experiments. In particular, Table 2 compares the current decay times form test results and theoretical calculations using Equation (11) for different test scenarios. Overall, the calculations and experimental observations match very well.

TABLE 2

| Case number (Condition) | Experimental current decay time | Calculated current decay time |
| --- | --- | --- |
| Case 1 (80 V, 40 A test with 40 µF capacitor) | 3.5 ms | 3.55 ms |
| Case 3 (200 V, 40 A test with 40 µF capacitor) | 3 ms | 3.13 ms |
| Case 4 (200 V, 40 A test with 1000 µF capacitor) | 7.5 ms | 7.73 ms |

Figure 13:
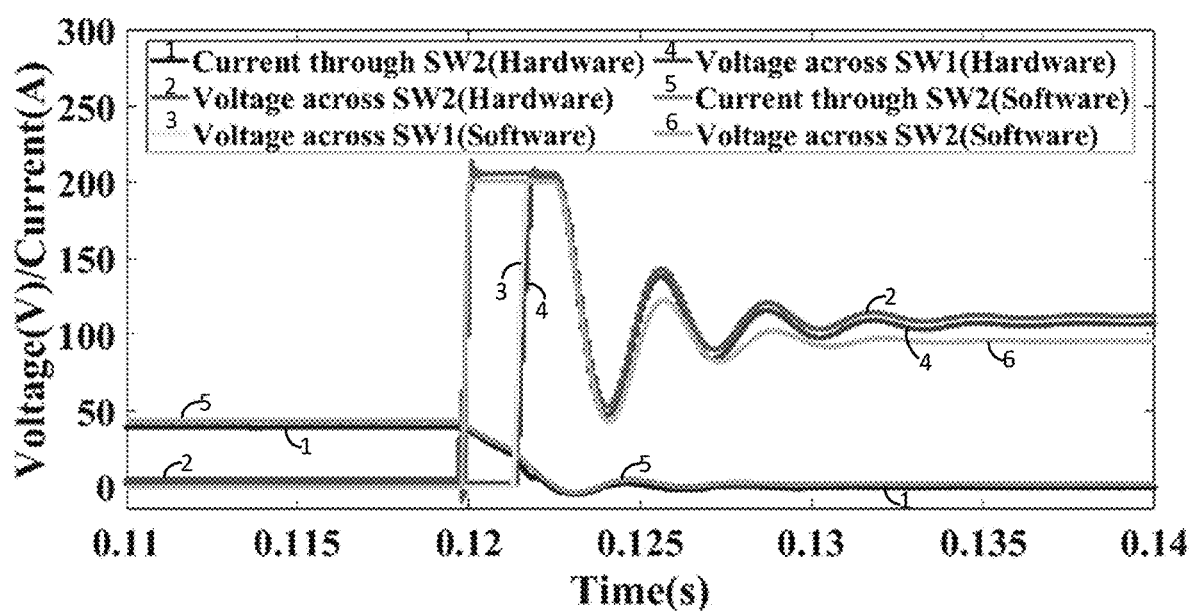

Case 5: In this experiment, the exemplary DC breaker circuitry is simulated in MATLAB Simulink and results are compared to those obtained from experimental results. Here, a 200V, 40 A test with 40 µF capacitors is performed and the compared results are illustrated in FIG. 13. In the simulation, SW1 is switched 1.5 ms after SW2. In both simulation and experimental results, the current is disrupted within 3 ms. Overall, the good match between the two tests shows the accuracy of the exemplary breaker modeling presented in the present disclosure.

The disclosed system and method have successfully increased the voltage rating of the mechanical switches used (28 VDC, 40 A) according to the results. Although the current disruption times presented in the tests are under a low-current condition, the experimental and simulation results from the exemplary breaker reveal that the current disruption time constant is L/R due to the predominance of Stages 3 and 4; i.e., it is equal to that of the current rise when fault occurs. Thus, the exemplary breaker circuitry is fast compared to conventional mechanical breakers (about 30 ms) and has a comparable breaking time when compared to the hybrid breakers (about 5 ms). Also, in the exemplary breaker circuitry, voltage is limited to that of the source unlike high voltage rise in solid-state switches and current disruption is conducted with minimal arc; i.e., no significant arc is produced unlike conventional LC redirecting circuits.

Figure 14:
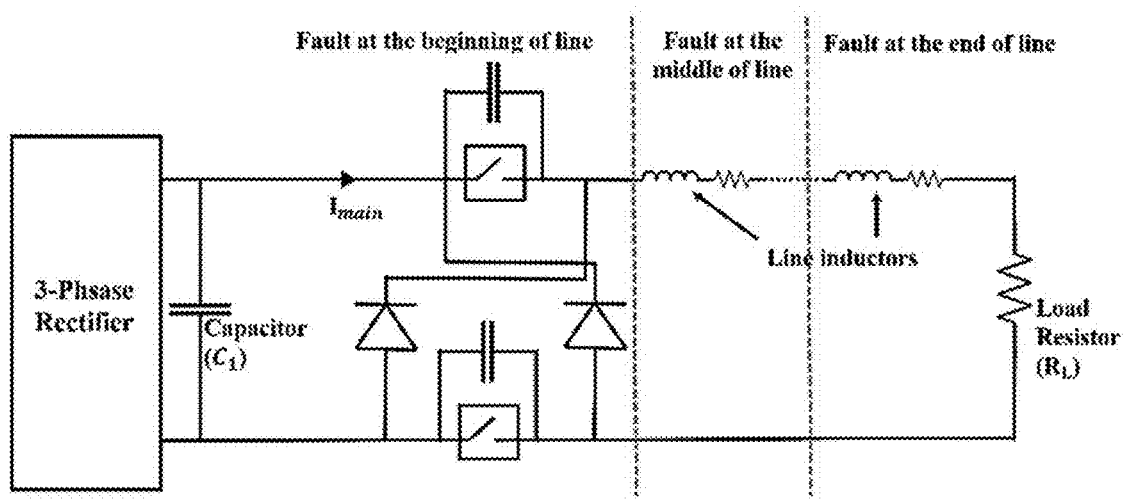
FIG. 14 shows a circuit diagram of a distribution line used in simulation study an exemplary DC circuit breaker in a power grid application in accordance with the present disclosure.

Case 6: In order to show the application of the exemplary breaker circuitry in the distribution grids, a simulation study is conducted in this section line using MATLAB Simulink. For the distribution line, we considered a 10 km long DC line with a total inductance of 3.33 mH and 33 mΩ for the entire length of the cable, i.e. 1 mH per 3 km and 3.3 mΩ per km for the DC line as shown in FIG. 14. A three-phase rectifier is used to generate 13.8 KV DC voltage to feed the DC line with a nominal current of 2000 A. The exemplary DC breaker uses 1000 µF capacitors. Short circuit faults are applied at the beginning, middle, and end of the line and currents and voltages through switches are observed ad illustrated in FIG. 15.

Figure 15:
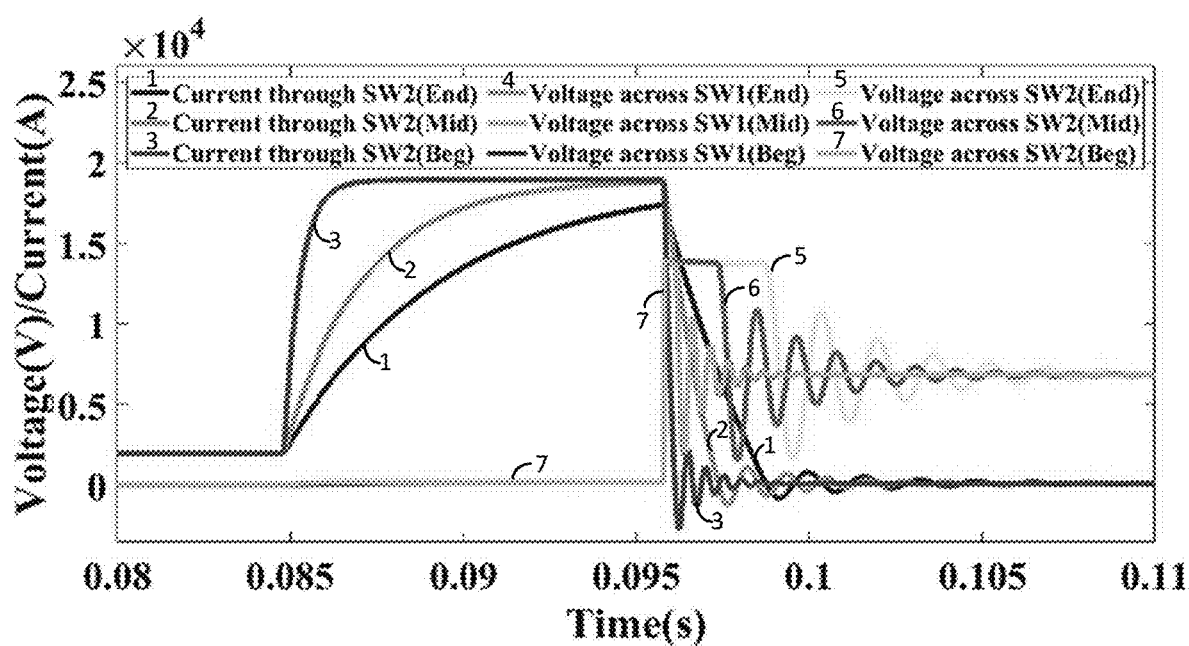
FIG. 15 shows a plot of voltages and currents across components of an experimental setup of the DC circuit breaker system in the simulation study of FIG. 14.

Here, the first fault is applied at the beginning, within 1 km of the source rectifier. The response time of the switches are set at 10 ms. As the switches are triggered, zero cross happens within 0.4 ms. The effective line inductance in case of fault happening at the beginning of the line is very small and thus the fault current rises rapidly and reaches its peak in very short time. Very fast mechanical breakers are needed to prevent this high current and high commutation voltage. When fault moves more towards the end of the line, the effective line inductance increases and the rate of rise of the fault current decreases resulting in lowered and delayed peak as shown in FIG. 15. Also due to higher line inductances, the fault clearing time increases to 1.6 ms and 3 ms for fault in the middle and at the end of the DC line, respectively.

Figure 16:
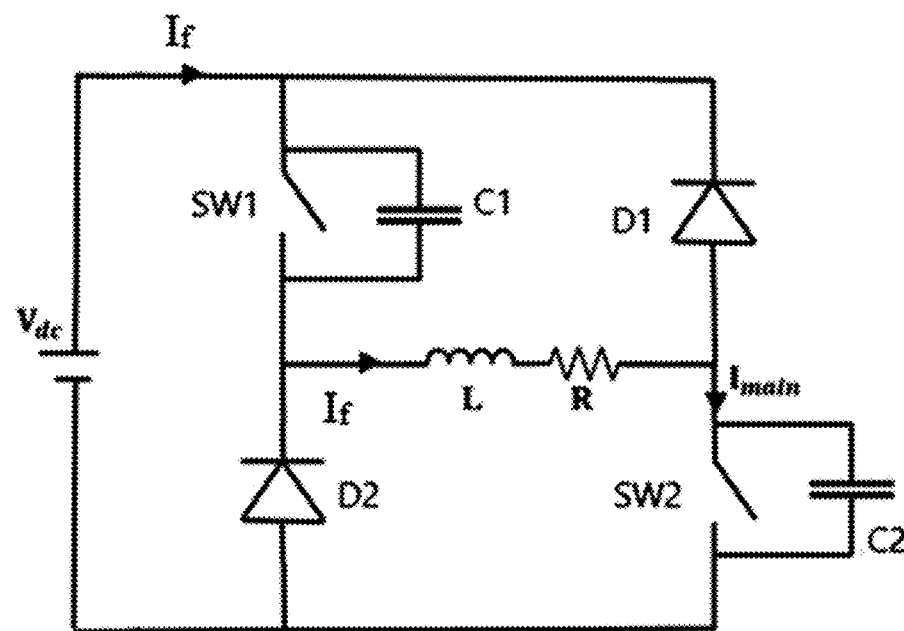
FIG. 16 shows a test configuration setup used to test four different scenarios for an exemplary DC circuit breaker system of the present disclosure.

Next, a test configuration setup was used to test four different scenarios for an exemplary DC circuit breaker system of the present disclosure. FIG. 16 shows a configuration of the test setup. The setup was tested in four different cases. All scenarios were tested at two different voltage levels (260v-480v), 3 times each. A capacitor bank used as the power supply in the test setup and is made of 6 racks, each containing 8 capacitors. Three racks in the upper part and three racks in the lower part are connected to each other in parallel. Then, the upper and the lower parts are connected in series. Each capacitor in the capacitor bank is 500V and 10000 microfarad. In the exemplary DC breaker, there are four capacitors that are parallelly connected to contactors. Each contactor is paralleled with two series capacitors. These capacitors are 500V and 2200 microfarad (large capacitor values tested). The testing was performed in low and high currents. The total load resistance was 1.1 ohm for low and 0.52 for high currents.

The four different scenarios being tested include (1) an exemplary DC circuit breaker with two diodes and two parallel large capacitors—low current; (2) an exemplary DC circuit breaker with two diodes and two parallel large capacitors—high current; (3) pre-existing available technology having only a circuit breaker (no additional components)—low current; and (4) pre-existing available technology with only a circuit breaker (no additional components)—high current.

Figure 17:
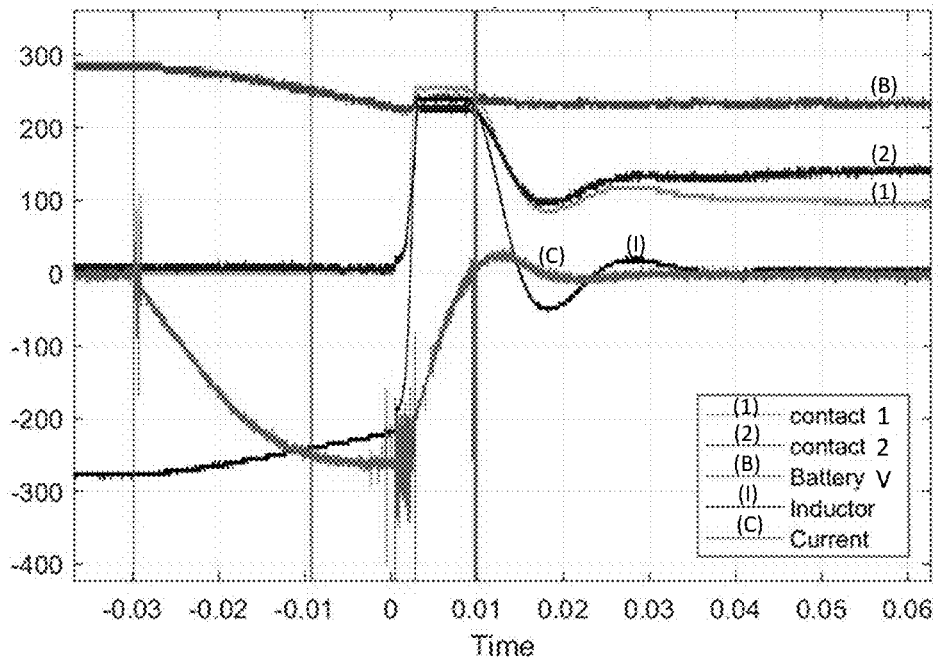
FIGS. 17-18 show voltages and currents at contacts of the mechanical switches and battery voltages for a first test scenario of an exemplary DC circuit breaker system at 260V and 480V, respectively.
Figure 18:
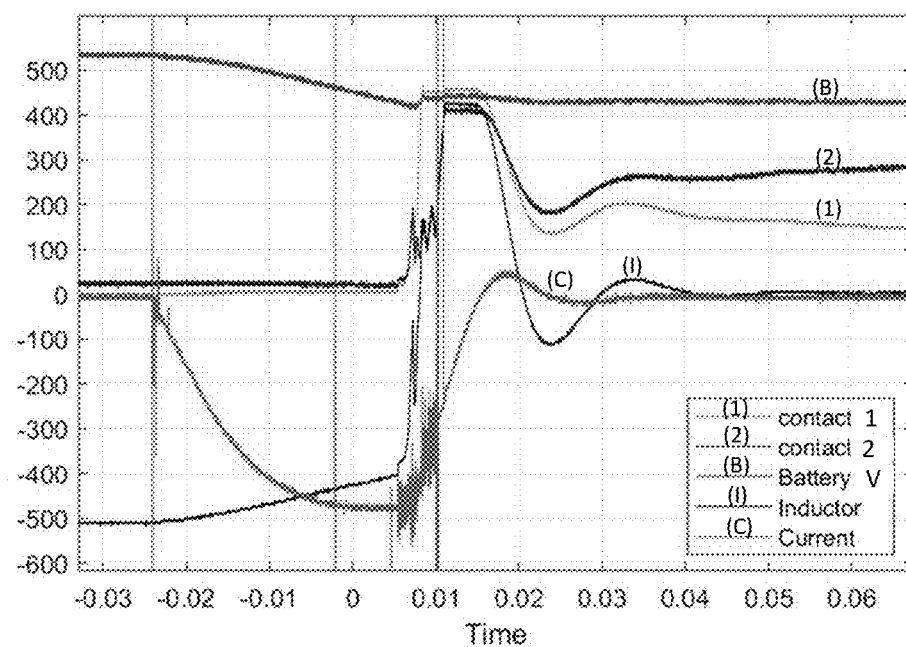
Figure 19:
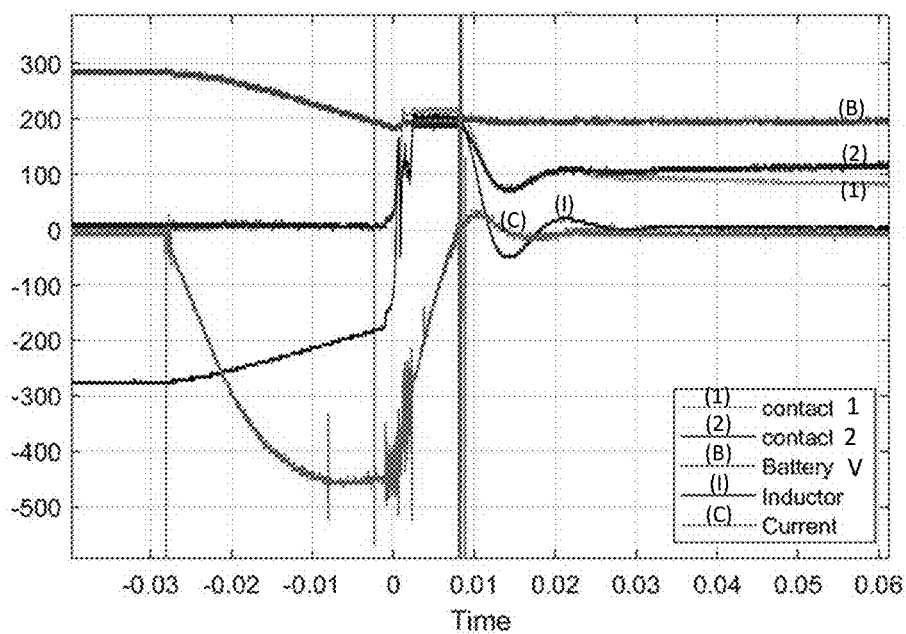
FIGS. 19-20 show voltages and currents at contacts of the mechanical switches and battery voltages for a second test scenario of an exemplary DC circuit breaker system at 260V and 480V, respectively.
Figure 20:
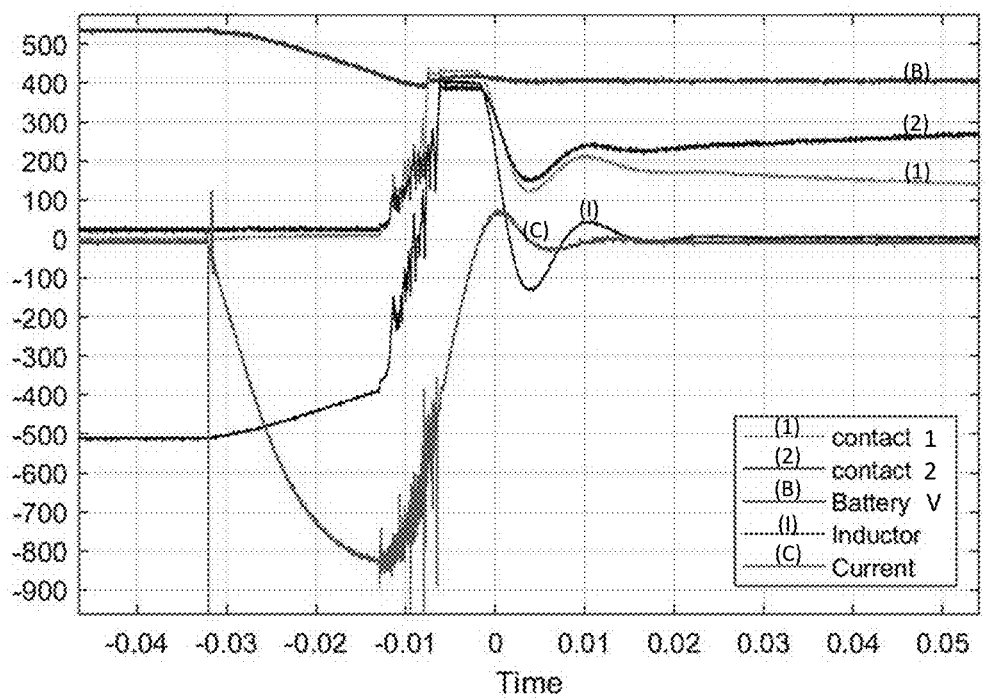
Figure 21:
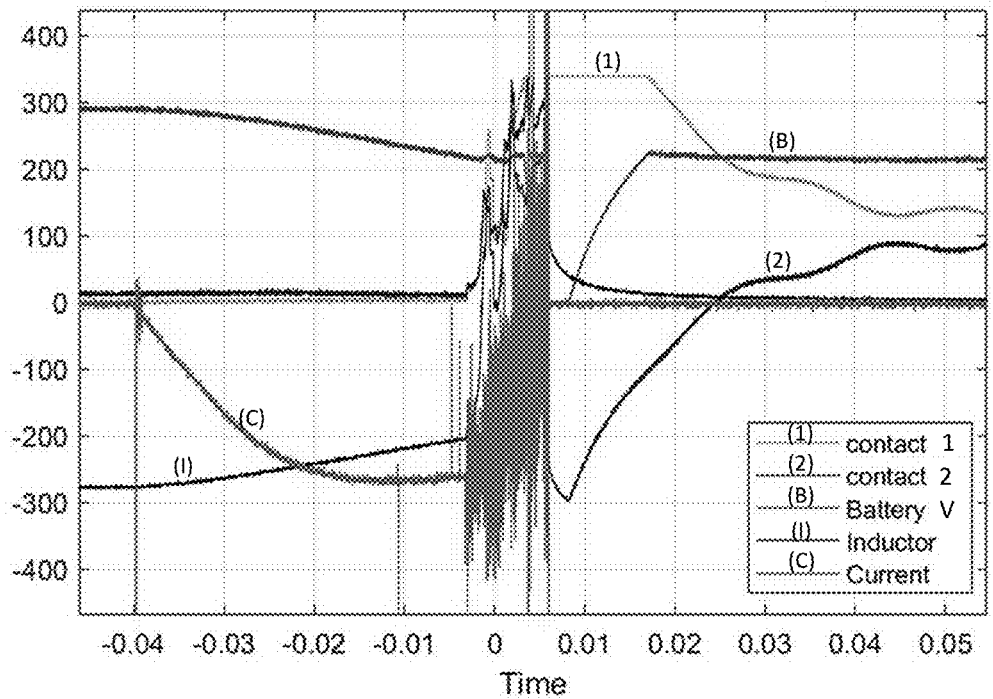
FIGS. 21-22 show voltages and currents at contacts of the mechanical switches and battery voltages for a third test scenario of a pre-existing DC circuit breaker system at 260V and 480V, respectively.
Figure 22:
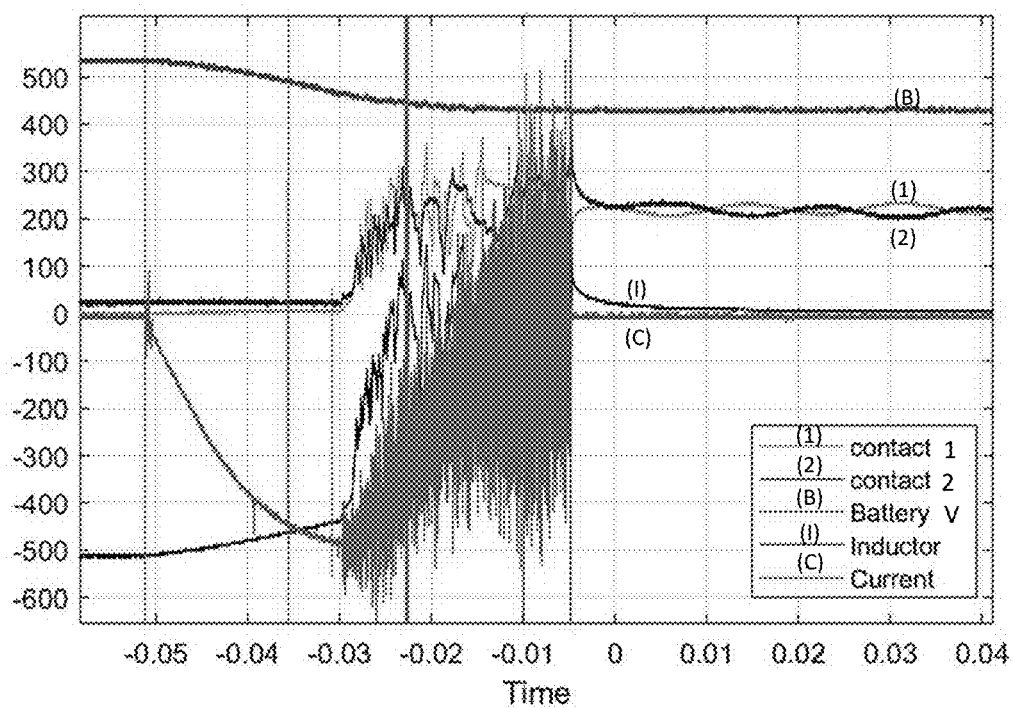
Figure 23:
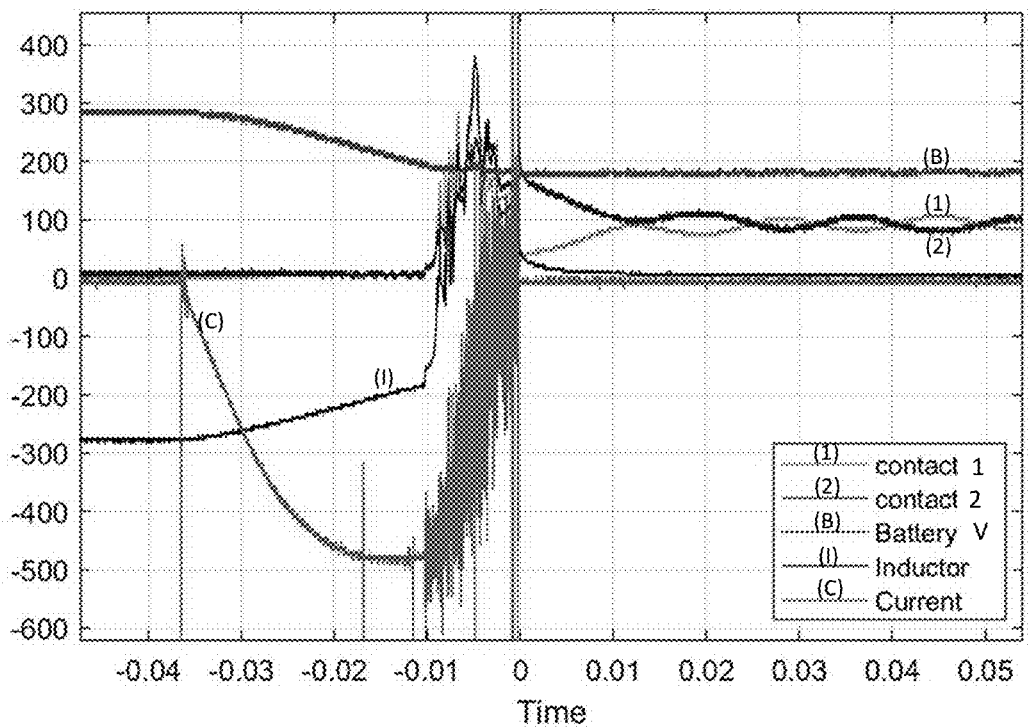
FIGS. 23-24 show voltages and currents at contacts of the mechanical switches and battery voltages for a fourth test scenario of a pre-existing DC circuit breaker system at 260V and 480V, respectively.
Figure 24:
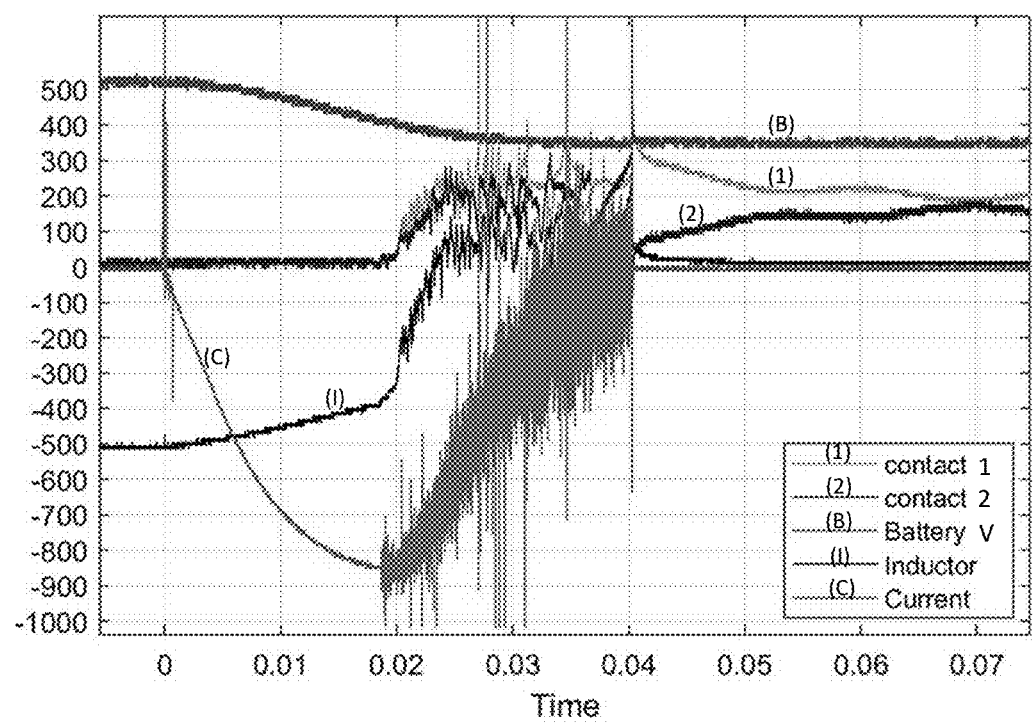

Testing results are provided in FIGS. 17-24. In particular, FIG. 17 shows voltages and currents at contacts of the mechanical switches and battery voltages for scenario (1) at 260V. FIG. 18 shows voltages and currents at contacts of the mechanical switches and battery voltages for scenario (1) at 480V. FIG. 19 shows voltages and currents at contacts of the mechanical switches and battery voltages for scenario (2) at 260V. FIG. 20 shows voltages and currents at contacts of the mechanical switches and battery voltages for scenario (2) at 480V. FIG. 21 shows voltages and currents at contacts of the mechanical switches and battery voltages for scenario (3) at 260V. FIG. 22 shows voltages and currents at contacts of the mechanical switches and battery voltages for scenario (3) at 480V. FIG. 23 shows voltages and currents at contacts of the mechanical switches and battery voltages for scenario (4) at 260V. FIG. 24 shows voltages and currents at contacts of the mechanical switches and battery voltages for scenario (4) at 480V. In comparing the results of the exemplary DC circuit breaker in FIGS. 17-20 with the pre-existing technologies shown in FIGS. 21-24, it is shown that an exemplary DC circuit breaker system and method can break the fault current effectively with minimal arc and significantly reduce the voltage across the mechanical switches.

Simulation and experimental results show satisfactory performance in current breaking, which keeps both current disruption time and transient over voltages below that of the available mechanical or hybrid breakers and within tolerance limit. The capacitors along with diodes clamp the voltage that occurs during the fault within the permissible limits. Therefore, the ratings of the primary mechanical switches as well as other components is maintained lower than that of static or hybrid technology. In addition, it is shown that rapid fault interruption is achieved and no significant arc occurs between breaker contacts. The proposed mechanism can potentially increase the voltage rating of the mechanical DC switches.

Figure 25:
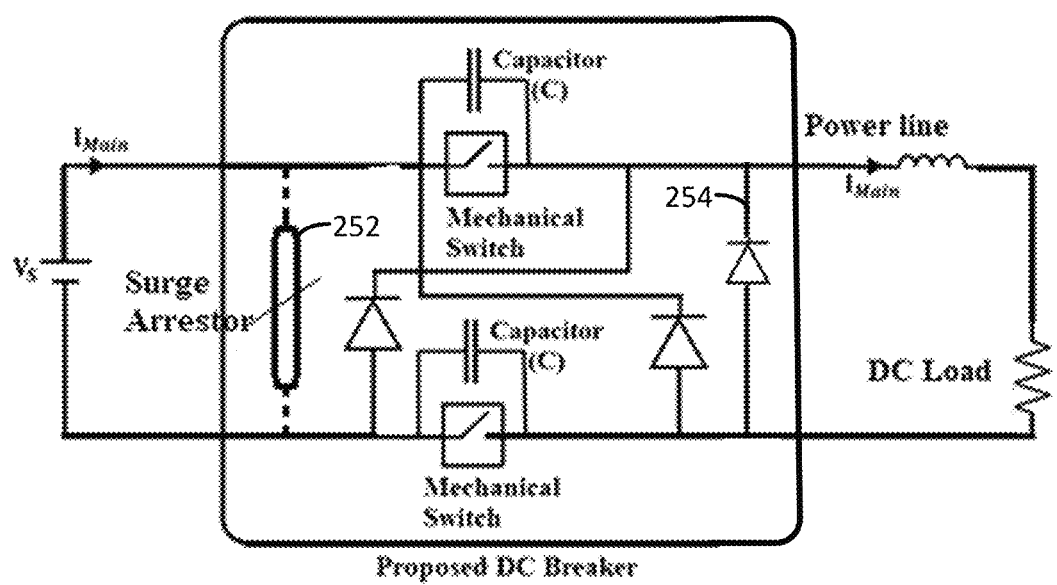
FIG. 25 shows an exemplary DC circuit breaker system that is equipped with a surge arrestor and a freewheeling diode in accordance with various embodiments of the present disclosure.

In various embodiments, an exemplary DC circuit breaker system is equipped with a surge arrestor 252 and a freewheeling diode 254 to harness the source and line/load inductances' voltage rise, respectively, as illustrated in FIG. 25. Thus, such a DC circuit breaker system returns part of the fault energy to the surge arrestor 252 and freewheeling diode 254, which in turn reduces the arc between the breaker's contacts. In various embodiments, the surge arrestor 252 is installed at the breaker's input and prevents excessive voltage rise at the breaker's input, whereas the freewheeling diode 254 prevents the voltage rise across the load and power line parasitic inductance at the breaker's output. This will in turn restricts the switching voltage overshoots across the breaker contacts and help remove the arc quickly.

It is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It is also to be understood that the terminology used herein is for purposes of describing particular embodiments only, and is not intended to be limiting. It is also possible in the present disclosure that steps can be executed in a different sequence where this is logically possible. It must be noted that, as used in the specification and the appended claims, the singular forms "a," "an," and "the" include plural referents unless the context clearly dictates otherwise.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A DC circuit breaker system comprising:
a first mechanical switch, wherein the first mechanical switch is configured to initiate a separation of contacts of the first mechanical switch in response to a fault current;
a first parallel capacitor that connects a first terminal and a second terminal of the first mechanical switch;
a second mechanical switch in series with the first mechanical switch, wherein the second mechanical switch is configured to initiate a separation of contacts of the second mechanical switch in response to the fault current;
a second parallel capacitor that connects a first terminal and a second terminal of the second mechanical switch;
a first diode that connects the first terminal of the first mechanical switch and the second terminal of the second mechanical switch; and
a second diode that connects the first terminal of the second mechanical switch and the second terminal of the first mechanical switch,
wherein opening of the first and second mechanical switches and turning off of the first and second diodes act to reverse a direction of a current flow and clear a current fault,
wherein the DC circuit breaker system is equipped with a surge arrestor at its input and a freewheeling diode at its output.

2. The system of claim 1, wherein a sending end of a power line is connected to the first terminal of the first mechanical switch and the first terminal of the second mechanical switch, wherein a receiving end of the power line is connected to the second terminal of the first mechanical switch and the second terminal of the second mechanical switch.

3. The system of claim 2, further comprising another surge arrestor device on the power line.

4. The system of claim 1, wherein the reversal of direction of the current flow delivers part of a fault energy back to a voltage source.

5. The system of claim 1, wherein the first and second mechanical switches operate asynchronously with respect to one another.

6. The system of claim 1, further comprising another surge arrestor device on a DC power line.

7. The system of claim 1, further comprising a surge arrestor device coupled between the first terminal of the first mechanical switch and the first terminal of the second mechanical switch.

8. A DC circuit breaker method comprising:
providing a DC circuit breaker circuit having a first mechanical switch in series with a second mechanical switch, a first capacitor in parallel with the first mechanical switch, a second capacitor in parallel with the second mechanical switch, a first diode coupled between a first terminal of the first mechanical switch and a second terminal of the second mechanical switch, and a second diode coupled between a first terminal of the second mechanical switch and a second terminal of the first mechanical switch;
connecting the DC circuit breaker circuit to a power line, wherein a sending end of a power line is connected to the first terminal of the first mechanical switch and the first terminal of the second mechanical switch, wherein a receiving end of the power line is connected to the second terminal of the first mechanical switch and the second terminal of the second mechanical switch;
during an initial stage of operation of the DC circuit breaker circuit, closing the first and second mechanical switches and turning off the first and second diodes;
activating a second stage of operation by opening the second mechanical switch in response to a fault condition on the power line, wherein current is rerouted through the second capacitor, wherein a first RLC circuit is formed comprising a power line resistance and inductance and the second capacitor until voltage across the second capacitor exceeds a source voltage, wherein the first diode turns on when the voltage across the second capacitor exceeds the source voltage, wherein the first RLC circuit generates an underdamped oscillation in the current causing the current to decay;
activating a third stage of operation by forming a first RL circuit in response to load current flowing through the first diode while the first mechanical switch remains closed, wherein the first RL circuit comprises power line resistance and inductance;
activating a fourth stage of operation by opening the first mechanical switch in response to the fault condition on the power line, wherein current is rerouted through the first capacitor, wherein a second RLC circuit is formed comprising a power line resistance and inductance and the first capacitor until voltage across the first capacitor exceeds the source voltage, wherein the second diode turns on when the voltage across the first capacitor exceeds the source voltage; and
activating a fifth stage of operation by forming a second RL circuit by load current flowing through the first and second diodes, wherein the second RL circuit comprises power line resistance and inductance, wherein current decays in the fifth stage and the current crosses zero; and
activating a sixth stage of operation by turning off the first and second diodes after the current crosses zero, wherein a third RLC is formed comprising the power line resistance, inductance, and the first and second capacitors, wherein voltages at the first and second capacitors decay in an underdamped manner;
wherein opening of the first and second mechanical switches and turning off of the first and second diodes act to reverse a direction of a current flow and clear a current fault,
wherein the DC circuit breaker system is equipped with a surge arrestor at its input and a freewheeling diode at its output.

9. The method of claim 8, wherein the first mechanical switch and the second mechanical switch are each configured to initiate a separation of contacts of the respective mechanical switch in response to a fault current within the DC circuit breaker circuit.

10. The method of claim 8, wherein the reversal of direction of the current flow delivers part of a fault energy back to the source voltage.

11. The method of claim 8, wherein the first mechanical switch and the second mechanical switch operate asynchronously.

12. The method of claim 8, further comprising coupling another surge arrestor device to the power line.

13. The method of claim 8, wherein after current is rerouted through the second capacitor, the second capacitor suppresses an arc at the second mechanical switch.

14. The method of claim 8, wherein after current is rerouted through the first capacitor, the first capacitor suppresses an arc at the first mechanical switch.

\* \* \* \* \*